United States Patent [19]
Shiah

[11] Patent Number: 5,929,588
[45] Date of Patent: Jul. 27, 1999

[54] ELECTRIC MOTOR CONTROL SYSTEM FOR AUTOMOBILE WIPER ASSEMBLY

[75] Inventor: Kyi-Shin Shiah, Portland, Oreg.

[73] Assignee: UT Automotive Dearborn, Inc., Dearborn, Mich.

[21] Appl. No.: 08/947,975

[22] Filed: Oct. 9, 1997

[51] Int. Cl.⁶ .............................. H02K 7/116; B60S 1/08
[52] U.S. Cl. ................. 318/653; 318/9; 318/443
[58] Field of Search .......................... 318/3, 4, 9, 652, 318/653, 678, 684, 443, 444, 466, 468, 538, 558, 15

[56] References Cited

U.S. PATENT DOCUMENTS

| | | |
|---|---|---|
| 2,615,945 | 10/1952 | Jaeschke . |
| 2,659,237 | 11/1953 | Wood . |

(List continued on next page.)

FOREIGN PATENT DOCUMENTS

| | | |
|---|---|---|
| 0 345 002 A2 | 6/1989 | European Pat. Off. . |
| 822 178 | 11/1951 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.

P. 100, *Machine Design*, 60 (1988) Oct. 13, No. 24, Cleveland, Ohio, US.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

(List continued on next page.)

*Primary Examiner*—Bentsu Ro
*Attorney, Agent, or Firm*—Harness, Dickey & Pierce, P.L.C.

[57] ABSTRACT

An electric motor control system for a motor vehicle rear wiper assembly that provides OEM custom wiper features such as programmable wiper angle, speed and parking capabilities. The system includes a single Hall effect sensor, in combination with a gear mechanism that is magnetized in a geometrically sequenced pattern, to provide high resolution and rotational direction and/or speed information to the encoder for motor control purposes.

16 Claims, 4 Drawing Sheets

5,929,588
Page 2

U.S. PATENT DOCUMENTS

| | | |
|---|---|---|
| 2,722,617 | 11/1955 | Cluwen et al. . |
| 2,959,803 | 11/1960 | Ziegler . |
| 3,361,005 | 1/1968 | Carpenter . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,523,204 | 8/1970 | Rand . |
| 3,574,882 | 4/1971 | Petry . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,803,627 | 4/1974 | Schuscheng . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,702,117 | 10/1987 | Tsutsumi et al. . |
| 4,733,147 | 3/1988 | Muller et al. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,333,351 | 8/1994 | Sato . |
| 5,355,061 | 10/1994 | Forhan . |
| 5,355,286 | 10/1994 | Flint . |
| 5,370,015 | 12/1994 | Moscatelli . |
| 5,519,258 | 5/1996 | Stroven et al. . |
| 5,568,858 | 10/1996 | Thompson . |
| 5,691,586 | 11/1997 | Yonnet et al. . |
| 5,694,812 | 12/1997 | Maue et al. . |
| 5,801,501 | 9/1998 | Redelberger ............................ 318/283 |
| 5,821,744 | 10/1998 | Shinjo et al. ......................... 324/207.2 |

OTHER PUBLICATIONS

"Mechanisms for Engineering Design" "Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

ELECTRIC MOTOR CONTROL SYSTEM FOR AUTOMOBILE WIPER ASSEMBLY

BACKGROUND OF THE INVENTION

This invention relates generally to electronic control systems and specifically to an electric motor control assembly including a single Hall effect sensor that senses a magnetic signal from a magnetized motor gear assembly, and that generates a control signal indicating the direction and/or speed of the electric motor.

Vehicle rear wiper assemblies have become a standard feature on many present-day motor vehicles. Typically, these rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed with the following U.S. Patents:, U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sept. 26, 1972; and, U.S. Pat. No. 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors and solenoids are required to actuate passenger door locks, antenna retraction mechanisms, headlamp cover retraction mechanisms, a fuel filler door lock and other similar functions. This increase in the number of electromagnetic devices has also resulted in the need for assembly controllers to control assembly component operation based on such factors as motor speed and/or direction.

One conventional approach to controlling small motor operation utilizes two Hall sensors each positioned at a position of 90 degrees relative to one another along the motor rotational axis in proximity to the motor. Each sensor senses the relative polarity of the motor and outputs a corresponding signal to the motor controller for motor control purposes. This approach, however, adds to overall system cost and assembly requirements, as two Hall elements are required and must be accurately positioned with respect to one another in proximity to the motor. Another approach uses motor monitoring systems that are contact sliding on the encoder disk or associated gears. These spring-loaded brush type contact systems, however, are often susceptible to component wear and signal contamination.

SUMMARY OF THE INVENTION

In accordance with the present invention, an electric motor control system is provided. The system is installed with a high resolution encoder in a motor vehicle wiper assembly that provides OEM custom wiper features such as programmable wiper angle, speed and parking capabilities. The electric motor control system includes a single Hall effect sensor, in combination with a magnet, to provide the encoder with high resolution and rotational direction sensing capabilities. Through use of only a single Hall element, the system minimizes overall system cost and assembly requirements when compared to conventional wiper assembly control systems.

More particularly, the present invention provides an electric motor control system. The system includes an electric motor, and a magnetic gear mechanism coupled to the electric motor to selectively connect the motor to a motor application. A controller is connected to the motor and is programmed to control operation of the motor. A magnetic sensor is located in proximity to the magnetic gear mechanism and has a circuit output connected to the controller. The magnetic sensor circuit senses magnetic fields generated by the encoder/gear assembly and generates motor operational data therefrom. The magnetic sensor circuit then provides the operational data to the controller through the circuit output for motor control purposes.

Accordingly, the present electric motor control system significantly reduces the piece cost, assembly cost, part proliferation and handling costs, wiring costs, and battery current consumption when compared to conventional electric motor control systems. Furthermore, the electric motor control system of the present invention significantly reduces weight and packaging space requirements while increasing system electrical and mechanical reliability. Additional advantages and features of the present invention will become apparent from the following description and appended claims, taken in conjunction with the accompanying drawings.

DETAILED DESCRIPTION OF THE PREFERRED EMBODIMENT

Figure 1:
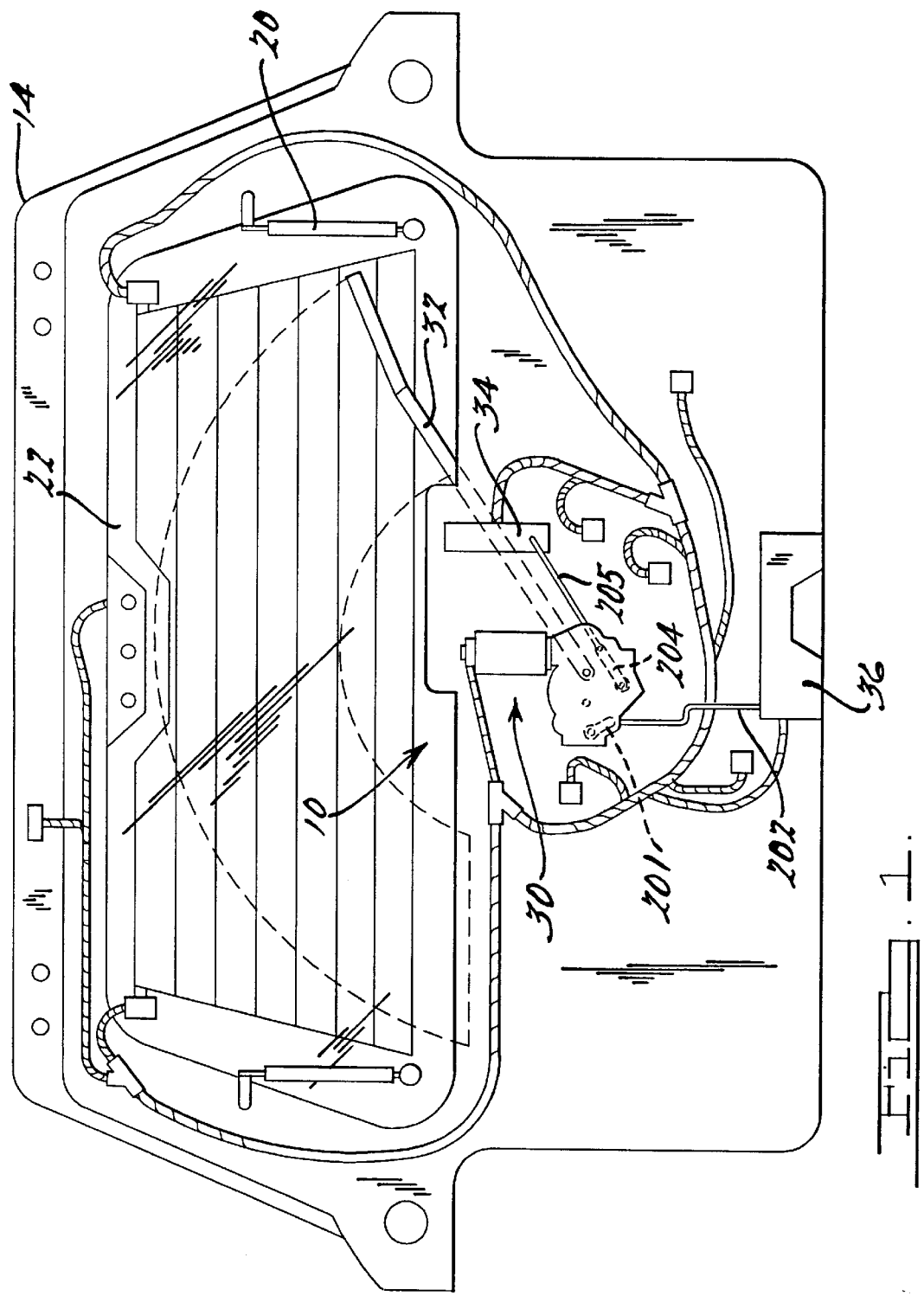
FIG. 1 is a front elevational view of an environment in which the electric motor control system of the present invention is implemented.

Referring to the drawings, FIG. 1 illustrates an electric motor assembly 10 incorporating a motor control system 12

(FIG. 2) according to the present invention. As shown in FIG. 1, an automobile rear liftgate door 14 represents an exemplary environment in which the motor control system of the present invention may be implemented. However, it will be appreciated by one skilled in the art that the motor control system of the present invention may be utilized in any environment in which an electric motor or other similar electromagnetic device is used.

The rear automobile liftgate door 14 can pivot about an upper pair of hinges coupled to a vehicle body structure (not shown). The liftgate door 14 has a rear window 18 pivotable between a closed position, substantially flush with the outer surface of the liftgate, and an open position about upper hinges (not shown). A pair of pneumatic cylinders 20 act to push the window 18 toward an open position when a lower portion of the window is released.

The multi-functional motor assembly 10 is mounted upon an inner surface of the liftgate door 14. The majority of the motor assembly 10 is hidden by an interior trim panel (not shown). The motor assembly shown in FIG. 1 includes a central drive and power transmission unit 30, a window wiper assembly 32, a window release latch or lock 34 and a liftgate lock 36, all of which are mounted on the liftgate door.

Figure 2:
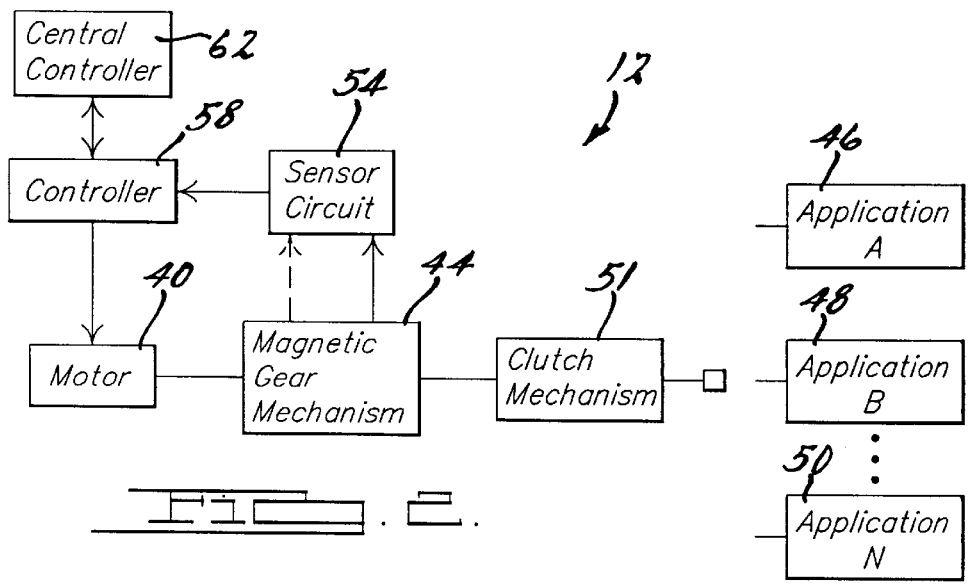
FIG. 2 is a block diagram of an electric motor control system of the present invention.

FIG. 2 illustrates the motor control system 12 of the present invention. The electric motor 40 controlled by the system is preferably a conventional 12 volt fractional horsepower, dc electromagnetic motor. However, it will be appreciated by those skilled in the art that other electric motor constructions are suitable for such motor applications. The motor control system is designed to oscillate the wiper assembly 32 at a predetermined frequency, such as forty-five cycles per minute (round trip) but other cycle frequencies may be chosen according to the particular wiper assembly design. The motor control system may also be designed to actuate the window release latch 34 and liftgate lock 36, and any other function requiring component oscillation or actuation.

A gear mechanism 44 is coupled to the motor and transfers output torque from the motor to one of several motor applications 46, 48, 50 through a clutch mechanism 51. The gear mechanism 44 is preferably a helical gear mechanism that includes a plurality of magnetized arcsections. Each arcsection has a predetermined polarity that is opposite the polarity of an adjacent arcsection of equal size. Each pair of equal size and oppositely polarized arcsections varies in size and geometric proportion to an adjacent pair of arcsections, as will be described below.

The clutch mechanism engages an application according to the particular application command input via control input 52, and the gear mechanism is thus oscillated through a particular pair of arcsections associated with the particular application chosen.

A sensor circuit 54 is located in operative proximity to the magnetic gear mechanism. The sensor circuit is a Hall effect sensor that operates to detect the magnetic field associated with the oscillating arcsection of the gear mechanism 44. The sensor circuit thus represents an advance over conventional motor control systems which typically require a pair of Hall elements placed in proximity to the motor itself to sense directional changes in magnetic flux, or which require circuitry to be physically connected to either the motor or the associated gears.

The sensor circuit generates an output signal based on the strength of the magnetic signal detected by the sensor circuit, to a controller 58.

For the particular embodiment associated with FIG. 1, the controller 58 preferably includes a rear node microprocessor such as a Motorola MC68HCO5V6 (or alternately MC68HCO5V7) chip. The controller is electrically connected to a central vehicle controller 62 in a multiplexed (MUX) fashion. A protocol, such as a J1850 MUX protocol, is used. The controller 58 energizes the motor in response to various wiper activation inputs received from the central controller 62, or from switches such as the liftgate lock 34, a window release latch 34, and/or various other positional switches or control knobs.

Figure 3:
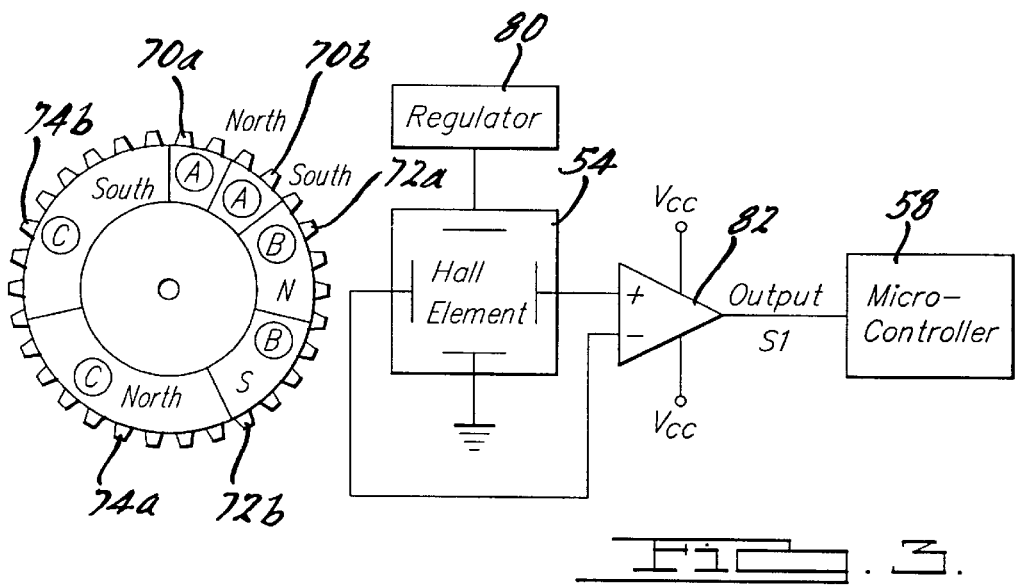
FIG. 3 is a front elevational view of a magnetized gear mechanism shown in FIG. 1, along with a schematic circuit diagram of the electric motor control system of the present invention.
Figure 4:
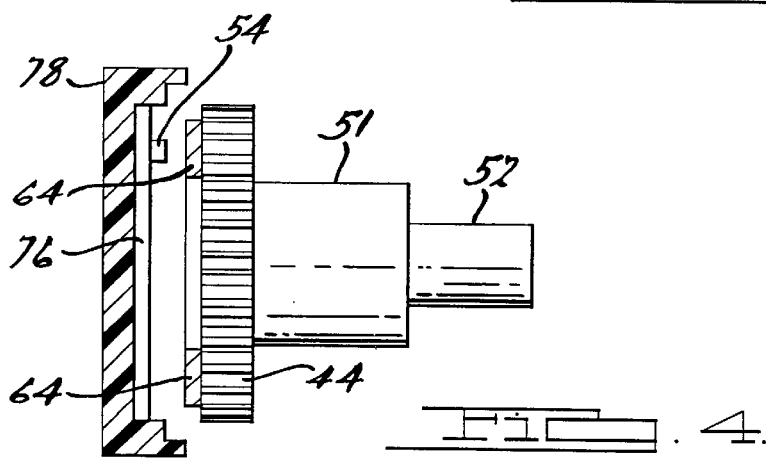
FIG. 4 is a side elevational view of the motor and gear mechanism shown in FIG. 3.

Referring to FIGS. 3 and 4, the magnetized gear mechanism 44 and the sensor circuit 54 of the present invention are shown in more detail. Referring first to the magnetized gear mechanism, the mechanism includes a magnetized medium, such as a ring magnet 64 that is magnetized into a plurality of geometrically sequenced pole pairs. Alternatively, the gear mechanism itself could be magnetized. In the embodiment shown, the gear includes three pole pairs 70a, 70b, 72a, 72b, and 74a, 74b. However, the number of poles associated with the gear may be as many as can be physically magnetized on the gear, with the smallest pole having an arc, or pole, calculated from the following equation:

$$P=180/(1+K+K^2+K^3+\ldots+K^N)$$

where K is an amplification constant of the consequent pole pair, and N is the total number of pole pairs.

Each pole in the plurality of pole pairs has a magnetic polarity that is opposite that of its corresponding pole. For instance, the pole 70a has a north polarity, while the pole 70b has a south polarity. Each region of the gear defined by one of the pole pairs corresponds to oscillation of the electric motor as the motor drives one of the applications 46, 48, 50. Thus, the magnetized gear provides high resolution magnetic signals to the sensor circuit as to motor positional index and direction of rotation.

Still referring to FIGS. 3 and 4, the sensor circuit includes a single Hall element that is mounted in operative proximity to the gear mechanism 44, and preferably by means such as a printed circuit board 76 mounted to a gear housing. As is well known in the art, the Hall element is operative to detect changes in magnetic field density, or flux, and outputs a corresponding analog signal when such changes are detected. In the present invention, the Hall element detects changes in magnetic field density associated with the different pole pairs as the gear oscillates in response to the motor driving one of the applications. The Hall element is capable of operating without being physically connected to the gear, thus minimizing the wear and contamination associated with other motor monitoring systems that are physically connected to the motor or the gear. The Hall element is powered by a conventional regulated D.C. system power supply 80, which is either +5V or +12V. The Hall element outputs a signal to a differential amplifier 82 when a change in magnetic field is detected. The differential amplifier in turn generates either a logical 0 or a logical 1 output, depending on the polarity of the pole sensed by the Hall element. In a preferred embodiment of the present invention, the differential amplifier outputs a 0 if a north pole is detected, and a 1 if a south pole is detected. The differential amplifier output is input into the controller 58, which in turn generates motor control output signals based on the differential amplifier input.

Figure 5:
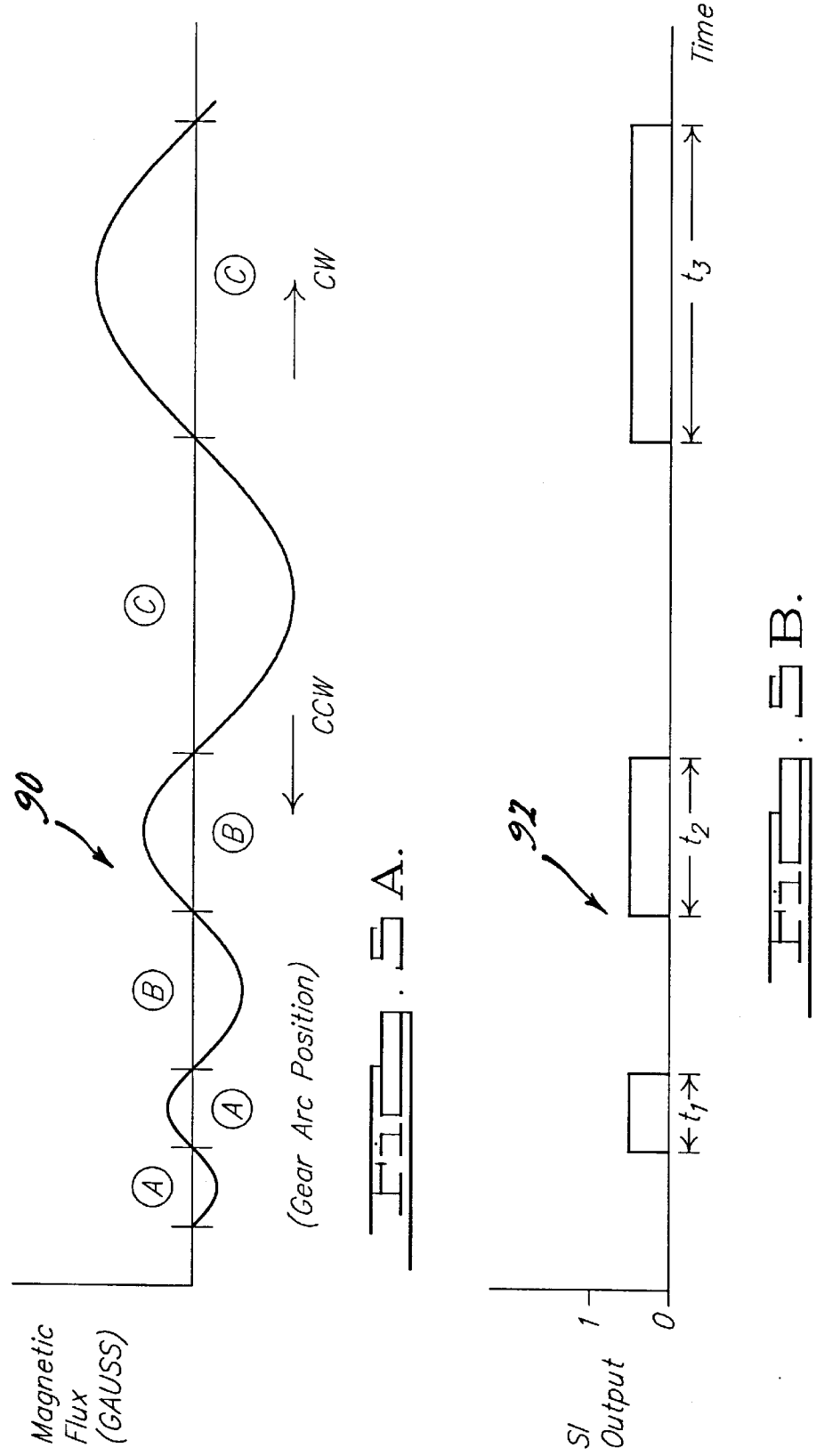
FIG. 5A is a graph of gear magnetic flux vs. gear mechanism arcsection location.
FIG. 5B is a graph of electric motor control system output vs. gear mechanism angular location.

Operation of the motor monitoring system of the present invention will now be described with reference to FIG. 3 and to FIGS. 5A–5B. As shown at 90 in FIG. 5A, gear mechanism magnetic flux varies according to the pole pair detected by the Hall element and the actual polarity of the particular pole. Also, the flux amplitude varies according to the pole magnetic strength and according to the location on the arc of the pole, as the flux tapers as the gear rotates to the edge of each pole. Also, as shown at 92 in FIG. 5B and as described above, the differential amplifier output is either a logical 0 or 1 based on the flux polarity.

The length of the output signal varies in proportion to the arcsection to enable the controller to determine which application is being run. For example, if pole pairs 70a, 70b and 72a, 72b correspond to a wiper oscillation function, the controller determines that the motor is operating in a first direction if $t_2>t_1$ and in a second direction if $t_2<t_1$. Thus, the controller 58 can determine motor parameters, such as speed and direction, based on the logic, and temporal length, of the differential amplifier output. The controller can then generate motor control signals to control motor operation in accordance with the controls programmed into the controller.

While various embodiments of this electric motor control system have been disclosed, it will be appreciated that various modifications may be made without departing from the present invention. For example, the system may be used to monitor the output of a solenoid, electromagnet or other electromagnetic devices used in place of the previously described electric motor system. It will further be appreciated that the electric motor control system of the present invention may be used in conjunction with a variety of other multiplexed or non-multiplexed, microprocessor or analog circuitry used to control a multi-functional motor system, either in a motor vehicle or non-motor vehicle environment.

The electric motor control system of the present invention may also be used to control an electric motor that selectively drives other known intermittent motion mechanisms such as more conventional Geneva mechanisms, intermittent gearing, escapements, ratchet mechanisms or other known selectively actuable devices. For example, reference should be made to the following U.S. patents which are incorporated by reference herewithin: U.S. Pat. No. 5,228,239 entitled "System for Automatically Opening and Closing Doors of Vehicles" which issued to Heo on Jul. 20, 1993; U.S. Pat. No. 4,352,299 entitled "Intermittent Motion Gear Apparatus" which issued to Riggs et al. on Oct. 5, 1982; U.S. Pat. No. 3,443,455 entitled "Intermittent Motion Device" which issued to Zugel on May 13, 1969; U.S. Pat. No. 3,443,442 entitled "Selectively Operable Intermittent Motion Apparatus" which issued to Schweihs on May 13, 1969; U.S. Pat. No. 3,442,146 entitled "Intermittent Rotary Motion" which issued to Simpson on May 6, 1969; and U.S. Pat. No. 3,421,380 entitled "Intermittent Motion Apparatus" which issued to Mansour on Jan. 14, 1969.

Figure 6:
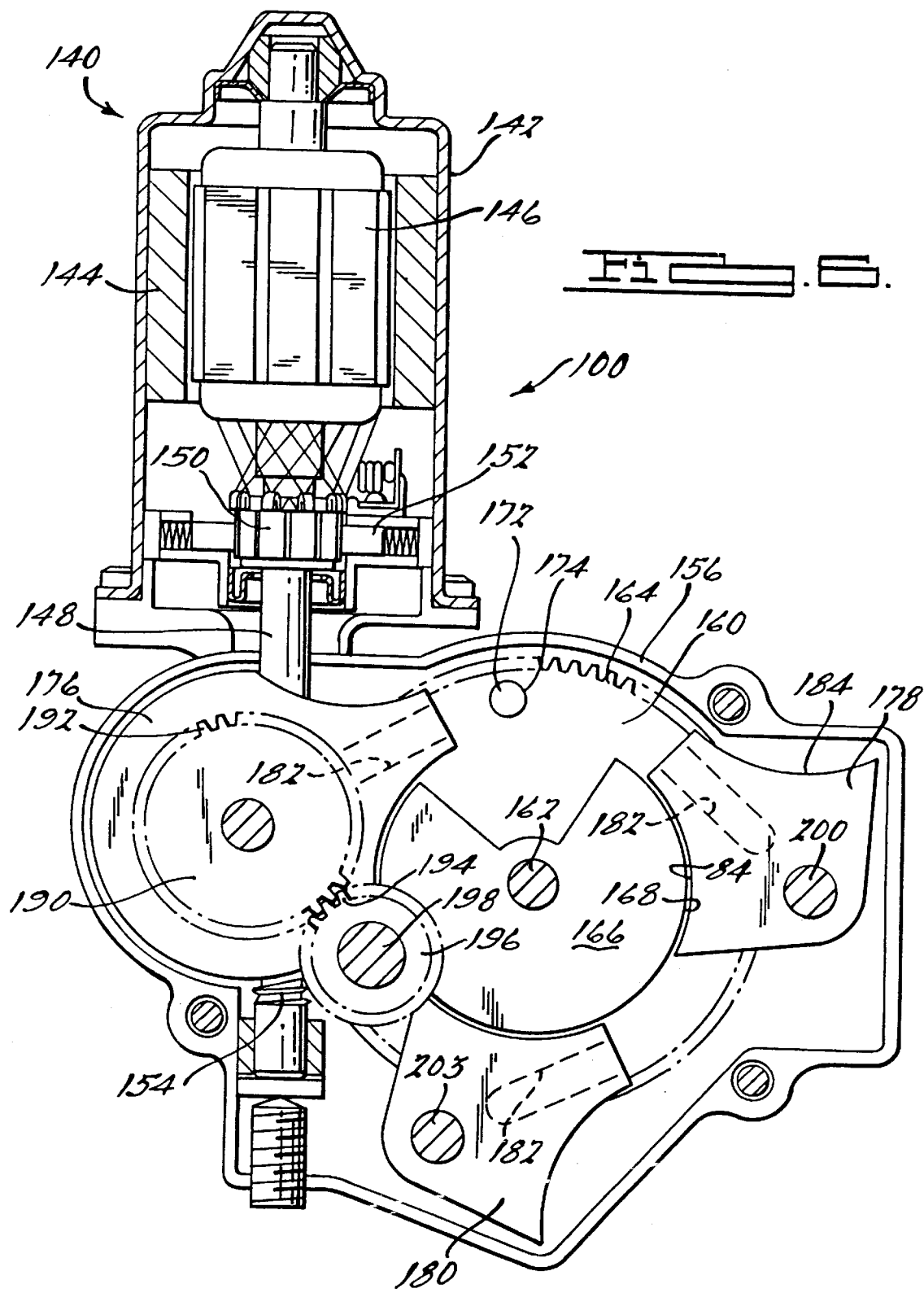
FIG. 6 is a side elevational view of an exemplary motor system in which the present invention is implemented.

One specific motor system that may be controlled by the motor control system of the present invention is shown at 100 in FIG. 6. The electric motor 140 controlled by the system is preferably a conventional 12 volt fractional horsepower, dc electromagnetic motor. However, it will be appreciated by those skilled in the art that other electric motor constructions are suitable for such motor applications.

The electric motor 140 includes a metallic motor housing 142 within which are stationary permanent magnets 144, a rotatable armature 146 with wire windings, a rotatable armature shaft 148 joined to armature 146, a commutator 150 electrically connected to the wire windings and rotatable with armature shaft 148, a brush card assembly 152 and various electronic components, bushings and retainers. A worm gear segment 154 is provided upon a portion of armature shaft 148 extending beyond motor housing 142.

A gear housing 156 is also provided for receiving worm gear segment 154 and the immediately adjacent portions of armature shaft 148. A main helical gear 160 is also housed and rotatably journalled within gear housing 156. Gear housing 156 is preferably made from cast aluminum. A plurality of knurled steel journalling pins 162 are press fit or otherwise attached within machined openings of gear housing 156. The placement of these openings in relation to each other is important. Pins 162 can alternately be molded as part of plastic gears and cams.

Helical gear 160 has an external set of helically oriented teeth 164 projecting entirely therearound for meshing with worm gear segment 154. A drum 166 is mounted upon a face of helical gear 160 for rotating therewith. Drum 166 has a partially circular peripheral surface 168 interrupted by a clearance indentation 170. Drum 166 and helical gear 160 are coaxially aligned for rotation about their respective journalling pin 162. A drive pin 172 projects from a face of helical gear 160 substantially parallel to the adjacent journalling pin 162. Drive pin 172 has a cylindrical driving interface surface 174 thereabout. Of course, a rotatable sleeve may alternately surround drive pin 172. Other alternate driving interface means may be employed such as an integrally molded finger, screw, rivet, spring, rib, plural projections or other similar formations protruding from a face of peripheral portion of helical gear 160. Helical gear 160 is preferably injection molded from a polymeric material such as acetyl.

A power transmission assembly of central drive and power transmission unit 30 employs three intermittent rotary motion mechanisms or cams 176, 178 and 180. Each cam has a single, linear, external open channel 182 defined by driven interfacing surfaces or walls therein. Driving interface surface 174 of drive pin 172 is selectively engagable against the walls defining channels 182 of each cam. Each cam is rotatable about its respective journalling pin 162. Furthermore, partially circular external surfaces 184 of each cam register with the partially circular peripheral surface 168 of drum 166. A relatively tight tolerance on these registering surfaces of about 1–2 thousandths of an inch is preferably used. Thus, unless each cam is aligned with indentation 170 of drum 166, partially circular peripheral surface 168 of drum 166 will act to prevent rotation of each cam. However, when indentation 170 of drum 166 aligns with an individual cam, concurrently with drive pin 172 engaging within a channel 182 of the same cam, continued rotation of helical gear 160 will cause the selectively coupled cam to rotate therewith. Moreover, the selectively coupled cam will have increased rotational acceleration as drive pin 172 moves closer to journalling pin 162 within channel 182. This rotational acceleration, then deceleration, achieves a desirable inertial ramping up and ramping down effect such that potentially harmful inertial stresses and cyclical fatigue within the device coupled thereto are avoided. The diameter of drive pin 172 should match channel 182 width within half a thousandth of an inch.

Cam 176 additionally has a spur gear 190 stacked coaxially thereupon for simultaneous movement therewith. Spur gear 190 has a peripheral set of teeth 192 extending entirely therearound for enmeshing with a mating external set of teeth 194 extending entirely around a driven pinion gear 196. Pinion gear 196 rotates the output shaft. The window wiper shaft 198 extends from a rear face of pinion gear 196 for moving in concert therewith. Wiper shaft 198 is attached to pinion gear 196 through rivets, insert molding, knurled press fitting, et cetera. The window wiper arm of wiper assembly 32 is mounted upon wiper shaft 98 in a conventional manner. Wiper shaft is preferably made from cold rolled steel. The system is designed to oscillate wiper assembly 32 at forty-five cycles per minute (round trip) but other cycle frequencies can be achieved.

A protuberance 200 projects from a rear face of cam 178 and engages with a lever 201 which, in turn, is attached to a liftgate lock rod 202. Protuberance 200, lever 201 and rod 202 are also considered to be lock couplings or coupling members. Lock connecting rod 202 is joined to liftgate lock 36 (see FIG. 1) for causing the mechanisms therein to move in response to movement of cam 178. Similarly, a protuberance 203 extends from and moves with a rear face of cam 180. A lever 204 is connected to protuberance 203 for moving therewith. A liftgate window release lock connecting rod 205 connects the lever 204 to liftgate window release lock 34 (see FIG. 1) for causing window releasing movement thereof in response to selective movement of cam 188. Protuberance 203, lever 204 and connecting rod 205 are also defined as liftgate window release lock couplings or coupling members. The above protuberances 201, 203 are preferably secured to their respective levers in a keyholed manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, jack screws, rack and pinion gear sets or the like.

In the motor system shown in FIG. 6, a plurality of magnetic pole pairs, such as those shown in FIG. 3, are affixed to the helical gear 160, while the Hall element is affixed to the gear housing 156, in a manner similar to that shown in FIG. 4.

Upon reading of the foregoing description, it should be appreciated that the electric motor control system of the present invention minimizes the number of required components when compared to conventional electric motor control systems. The electric motor control system of the present invention thereby simplifies system installation and minimizes associated system cost. The electric motor control system of the present invention also eliminates system wear and signal contamination problems associated with many motor control systems requiring physical connection to the motor or associated gears.

It is intended by the following claims to cover these and any other departures from the disclosed embodiments which fall within the true spirit of this invention.

The invention claimed is:

1. An electric motor control system, comprising:
   a magnetic gear mechanism coupled to an electric motor to selectively connect the motor to a motor application, the gear mechanism further defined as a circular gear having at least one magnetic pole pair and having an oscillation directly related to motor speed and direction;
   a controller connected to the motor and programmed to control operation of the motor; and
   a Hall effect magnetic sensor located in proximity to the magnetic gear mechanism and having a circuit output connected to the controller, the magnetic sensor being operative to sense rotational speed and direction of the motor through the circular gear by sensing movement of the at least one magnetic pole pair and to generate motor operational data therefrom, the magnetic sensor providing the operational data to the controller through the circuit output for motor control purposes.

2. The electric motor control system of claim 1, wherein the circular gear has a plurality of magnetic pole pairs, the magnetic sensor being operative to sense rotational speed and direction of the circular gear by sensing movement of one of the plurality of magnetic pole pairs, the magnetic sensor also being operative to determine a particular application being driven by the motor by sensing the movement of the particular pole pair associated with the application.

3. The system of claim 2, wherein the plurality of magnetic pole pairs are arranged in a geometrically sequenced signal strength pattern.

4. The system of claim 2, wherein the pole pitch of the smallest pole pair is calculated from the following equation:

$$P=180/(1+K+K^2+K^3+\ldots+K^N)$$

where K is an amplification constant of the consequent pole pair, and N is the total number of pole pairs.

5. The system of claim 2, wherein the circuit output comprises a differential amplifier operatively connected to the Hall effect magnetic sensor to generate a logical 0 output signal if the Hall effect magnetic sensor senses a pole having a first polarity, and a logical 1 output signal if the Hall effect magnetic sensor senses a pole having a second polarity.

6. The system of claim 5, wherein the output signal generated by the differential amplifier has an associated signal length that allows the controller to determine the specific pole region that is sensed by the magnetic sensor.

7. The system of claim 2, wherein the controller determines that the motor is rotating in a first direction if a first output signal length is greater than a second successive signal length, and that the motor is rotating in a second direction if the first output signal length is less than the second output signal length.

8. A system for sensing operational parameters of an electric motor in a motor vehicle wiper assembly, comprising:
   a wiper assembly motor that selectively oscillates a wiper in a predetermined pattern at a selected speed;
   a gear mechanism connected to an output of the electric motor and being operative to transfer motor torque to a motor application, the gear mechanism defining a plurality of magnetic pole pairs arranged in a predetermined magnetization pattern to indicate a motor operating condition;
   a magnetic sensor placed operative with the magnetized gear to sense a motor operating condition by sensing an oscillation pattern of the gear mechanism;
   a sensor output that generates a signal in response to the sensed motor operating condition; and
   a controller connected to both the motor and the sensor output that is programmed to receive the sensor output signal and to output corresponding control signals to the motor.

9. The system of claim 8, wherein the magnetic sensor comprises a single Hall effect sensor that senses rotation of the gear mechanism.

10. The system of claim 9, wherein the gear mechanism comprises a circular gear having a plurality of magnetic pole pair and having an oscillation directly related to motor speed and direction, and the magnetic sensor having a circuit output connected to the controller being operative to sense rotational speed and direction of the motor through the circular gear by sensing movement of at least one magnetic pole pair.

11. The system of claim 10, wherein the circular gear has a plurality of magnetic pole pairs, the magnetic sensor circuit output being operative to sense rotational speed and direction of the circular gear by sensing movement of one of the plurality of magnetic pole pairs, the magnetic sensor circuit output also being operative to determine a particular application being driven by the motor by sensing the movement of the particular pole pair associated with the application.

12. The system of claim 11, wherein the plurality of magnetic pole pairs are arranged in a geometrically sequenced signal strength pattern.

13. The system of claim 11, wherein the pole pitch of the smallest pole pair is calculated from the following equation:

$$=180/(1+K+K^2+K^1+\ldots+K^N)$$

where K is an amplification constant of the consequent pole pair, and N is the total number of pole pairs.

14. The system of claim 11, wherein the magnetic sensor circuit output comprises a differential amplifier operatively connected to the Hall effect sensor to generate a logical 0 output signal if the Hall effect sensor senses a pole having a first polarity, and a logical 1 output signal if the Hall effect sensor senses a pole having a second polarity.

15. The system of claim 14, wherein the output signal generated by the differential amplifier has an associated signal length that allows the controller to determine the specific pole region that is sensed by the circuit.

16. The system of claim 11, wherein the controller determines that the motor is rotating in a first direction if a first output signal length is greater than a second successive signal length, and that the motor is rotating in a second direction if the first output signal length is less than the second output signal length.

* * * * *